(12) United States Patent
Sakai (10) Patent No.: US 7,389,448 B2
(45) Date of Patent: Jun. 17, 2008

(54) ELECTRONIC DEVICE WHICH TRANSMITS DATA TO ANOTHER ELECTRONIC DEVICE AND CAUSES THE ANOTHER ELECTRONIC DEVICE TO PERFORM DATA PROCESSING AND DATA PROCESSING METHOD

(75) Inventor: Tatsuhiko Sakai, Nakano-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 520 days.

(21) Appl. No.: 10/548,885

(22) PCT Filed: Apr. 2, 2004

(86) PCT No.: PCT/JP2004/004869

§ 371 (c)(1),
(2), (4) Date: Sep. 14, 2005

(87) PCT Pub. No.: WO2004/092943

PCT Pub. Date: Oct. 28, 2004

(65) Prior Publication Data

US 2006/0158518 A1    Jul. 20, 2006

(30) Foreign Application Priority Data

Apr. 15, 2003    (JP)    ............................. 2003-110342

(51) Int. Cl.
*G06F 11/00*    (2006.01)
(52) U.S. Cl. .......................................... 714/48; 714/57
(58) Field of Classification Search ................... 714/48, 714/47, 51, 57; 358/3.03, 3.04; 400/6
See application file for complete search history.

(56) References Cited

U.S. PATENT DOCUMENTS

| 5,943,503 | A | | 8/1999 | Kai ............................. 395/839 |
| 6,078,400 | A | * | 6/2000 | Mizutani ..................... 358/1.14 |
| 6,122,073 | A | * | 9/2000 | Miyasaka et al. ........... 358/434 |
| 6,375,306 | B1 | * | 4/2002 | Tsukagoshi ................... 347/40 |
| 6,603,506 | B2 | | 8/2003 | Ogawa et al. ............ 348/207.2 |

(Continued)

FOREIGN PATENT DOCUMENTS

JP    2-236716    9/1990

(Continued)

OTHER PUBLICATIONS

Foreign Search Report mailed Nov. 16, 2006, issued in counterpart application.

*Primary Examiner*—Dieu-Minh Le
(74) *Attorney, Agent, or Firm*—Fitzpatrick, Cella, Harper & Scinto (57) ABSTRACT

A list of processing data and the number of times of processing is notified to another electronic device to cause the another electronic device to perform data processing. When an error occurs in the another electronic device, a re-processing request of unprocessed data is formed again together with a list and notified. At this time, a printing state of a printer is designed to be determined and displayed by an image pickup device. When an image which is not printed is designated to be re-printed when an error occurs in the printer, a list of an image designated to be re-printed and the number of prints is re-formed and re-notified. Communication of printing data is performed by Bluetooth communication.

13 Claims, 9 Drawing Sheets

U.S. PATENT DOCUMENTS

| | | | |
|---|---|---|---|
| 6,967,743 B1* | 11/2005 | Kumazawa | 358/1.9 |
| 2001/0028473 A1* | 10/2001 | Yamasaki et al. | 358/1.15 |
| 2001/0029530 A1 | 10/2001 | Naito et al. | 709/223 |
| 2002/0080250 A1 | 6/2002 | Ogawa et al. | 348/232 |

FOREIGN PATENT DOCUMENTS

| | | |
|---|---|---|
| JP | 6-242901 | 9/1994 |
| JP | 06-242901 A | 9/1994 |
| JP | 8-44505 | 2/1996 |
| JP | 9-251356 | 9/1997 |
| JP | 10-65867 | 3/1998 |
| JP | 10-126724 | 5/1998 |
| JP | 10-229534 | 8/1998 |
| JP | 2002-125175 | 4/2002 |
| JP | 14-320174 A | 10/2002 |
| JP | 2002-344674 | 11/2002 |

* cited by examiner

```
[HDR]
GEN REV=01.00
GEN CRT="Ultra Shot"
GEN DTM=2003:03:31:14:18:52

[JOB]
PRT PID=001
PRT TYP=STD
PRT QTY=001
IMG FMT=EXIF2-J
<IMG SRC="./IMAGE_0001.JPG">

[JOB]
PRT PID=002
PRT TYP=STD
PRT QTY=002
IMG FMT=EXIF2-J
<IMG SRC="./IMAGE_0003.JPG">

[JOB]
PRT PID=003
PRT TYP=STD
PRT QTY=001
IMG FMT=EXIF2-J
<IMG SRC="./IMAGE_0004.JPG">

[JOB]
PRT PID=004
PRT TYP=STD
PRT QTY=003
IMG FMT=EXIF2-J
<IMG SRC="./IMAGE_0007.JPG">
```

FIG. 6

| File Name | Print |
|---|---|
| IMAGE 0001.JP | 0/1 |
| IMAGE 0003.JP | 0/2 |
| IMAGE 0004.JP | 0/1 |
| IMAGE 0007.JP | 0/3 |

FIG. 7

| File Name | Print |
|---|---|
| IMAGE 0001.JP | 1/1 |
| IMAGE 0003.JP | 0/2 |
| IMAGE 0004.JP | 0/1 |
| IMAGE 0007.JP | 0/3 |

| SELECT FILE TO BE RE-PRINTED | | |
|---|---|---|
| File Name | Print | RE-PRINTING |
| IMAGE 0001.JP | 1/1 | |
| IMAGE 0003.JP | 1/2 | 1 |
| IMAGE 0004.JP | 0/1 | 1 |
| IMAGE 0007.JP | 0/3 | 3 |

FIG. 11

PLEASE SELECT PRINTER

```
[HDR]
GEN REV=01.00
GEN CRT="Ultra Shot"
GEN DTM=2003:03:31:14:20:32

[JOB]
PRT PID=002
PRT TYP=STD
PRT QTY=001
IMG FMT=EXIF2-J
<IMG SRC="./IMAGE_0003.JPG">

[JOB]
PRT PID=003
PRT TYP=STD
PRT QTY=001
IMG FMT=EXIF2-J
<IMG SRC="./IMAGE_0004.JPG">

[JOB]
PRT PID=004
PRT TYP=STD
PRT QTY=003
IMG FMT=EXIF2-J
<IMG SRC="./IMAGE_0007.JPG">
```

ELECTRONIC DEVICE WHICH TRANSMITS DATA TO ANOTHER ELECTRONIC DEVICE AND CAUSES THE ANOTHER ELECTRONIC DEVICE TO PERFORM DATA PROCESSING AND DATA PROCESSING METHOD

TECHNICAL FIELD

The present invention relates to an electronic device which transmits data to another electronic device and causes the another electronic device to perform data processing and a data processing method.

BACKGROUND ART

A conventional method of printing a photographed image is generally performed through a PC such that an image file is transferred to the PC to request printing of the image file from the PC. However, as disclosed in U.S. Pat. No. 6,603,506 (Japanese Patent Application Laid-Open No. H10-065867), an image pickup device and a printer are directly connected to each other, so that an image in the image pickup device can be printed without a PC. A standard of measure, related to so-called wireless direct printing, in which a photographed image is directly transferred from an image pickup device to a printer with wireless communication to print the image is designed by Camera & Imaging Products Association (CIPA) in Japan. According to this standard, a conventional printing process of a photographed image performed through a PC can be directly performed between an image pickup device and a printer which are connected to each other independently of manufacturers or machine types. The printing process can be easily performed at any place by using wireless communication.

However, although procedures of the printing process is determined in the above standard, a user interface scheme in an image pickup device is not determined. For this reason, a specific message output to a user by the image pickup device in printing, a manner of handling an error notification, and a specific interaction with the user performed to restart the printing process are dependent on packaging. A method which is more convenient and simple for a user is demanded.

When an image from an image pickup device is stored in a storage such as a hard disk, a message output when the image stored in the storage is printed in the printer device is output, an error notification performed when an error occurs, and a retrial performed after error recovery are also dependent on packaging. A method which is more convenient and simple for a user is demanded.

DISCLOSURE OF THE INVENTION

An object of the present invention is to provide a user interface which is more convenient for a user and has good usability when data processing is caused to be performed by another device.

It is an object of the present invention to provide a drawback caused by a variation in recognition of error states between the devices when a retrial is performed after occurrence of an error of another device.

It is an object of the present invention to provide to make it possible to perform a retrial depending on a state of another device when information which is notified to the another device is re-formed.

It is an object of the present invention to make it possible to detect an error of another device even if the another device does not have a function such as an error notification.

The objects and features will be apparent from the following specification and drawings.

BEST MODES FOR CARRYING OUT THE INVENTION

Embodiments of the present invention will be described below with reference to the accompanying drawings.

Figure 1:
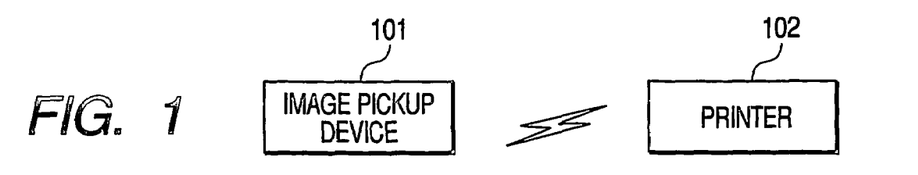
FIG. 1 is an example of one embodiment of the present invention.

FIG. 1 shows an image pickup device 101 such as a digital camera and a printer 102 according to an embodiment of the present invention.

In this embodiment, the image pickup device 101 transfers a printing request to the printer 102 by using Bluetooth, which is one of short-distance wireless communication schemes. The printer 102 acquires image data to be printed designated in the printing request from the image pickup device 101 on the basis of the received printing request, and prints the image data.

In this embodiment, DPOF (Digital Print Order Format) is used as a data format of the printing request. However, it is specified here that the printing request may be described in XML (extensible Markup Language). In this embodiment, Bluetooth which is a short-distance wireless communication scheme will be explained as wireless communication. However, it is specified here that a wireless LAN standardized by IEEE802.11a/b/g/h or the like, UWB (Ultra Wide Band), HAVi, ZigBee, and other wireless communication schemes can be applied. The configuration of the image pickup device 101 in this embodiment will be described below with reference to the functional block diagram shown in FIG. 2.

Figure 2:
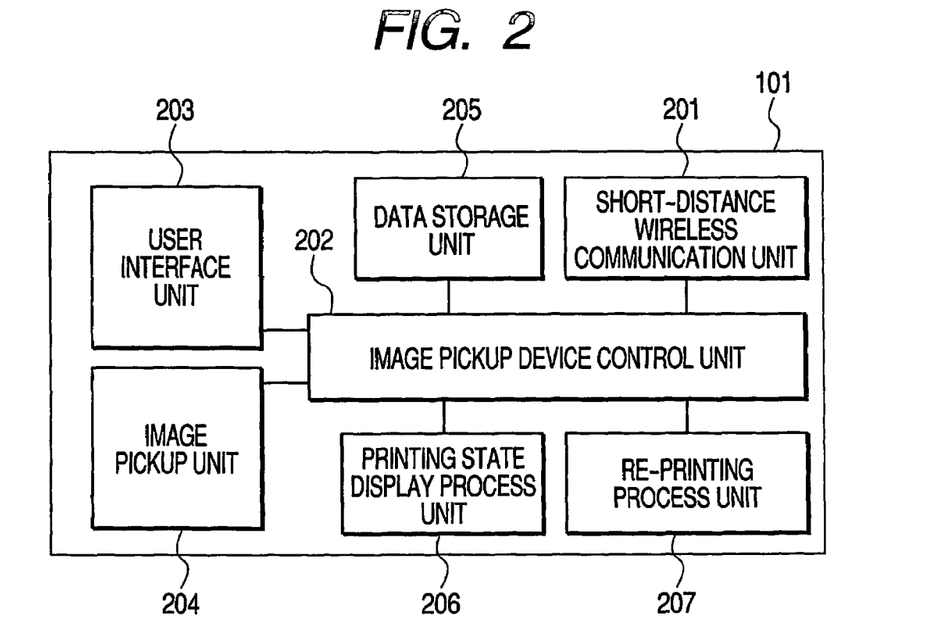
FIG. 2 is a diagram of a configuration of functional blocks of an image pickup device according to the embodiment of the present invention.

The image pickup device 101 has at least a short-distance wireless communication unit 201, an image pickup device control unit 202, a user interface unit 203, an image pickup unit 204, a data storage unit 205, a printing state display process unit 206, and a re-printing process unit 207 which serve as functional blocks.

The short-distance wireless communication unit 201 has a function which uses a short-distance wireless communication scheme to perform wireless communication with a peripheral terminal.

The user interface unit 203 has a function which transmits an input from a user to the image pickup device control unit 202 and a function which outputs a message to be transmitted from the image pickup device control unit 202 to the user.

The image pickup unit 204 has, as a main function of the image pickup device 101, a function of performing an image pickup process.

The data storage unit 205 has a function which stores image data photographed by the image pickup unit 204, information notified from a printer, and the like.

The printing state display process unit 206 has a function which shows a printing state in a printing data transfer process to a user.

The re-printing process unit 207 has a function which performs a re-printing process of image data the printing of which is not completed when the printing data transfer process is interrupted or after the printing data transfer process is ended on its way. The configuration of the printer 102 in this embodiment will be described below with reference to the functional block diagram shown in FIG. 3.

Figure 3:
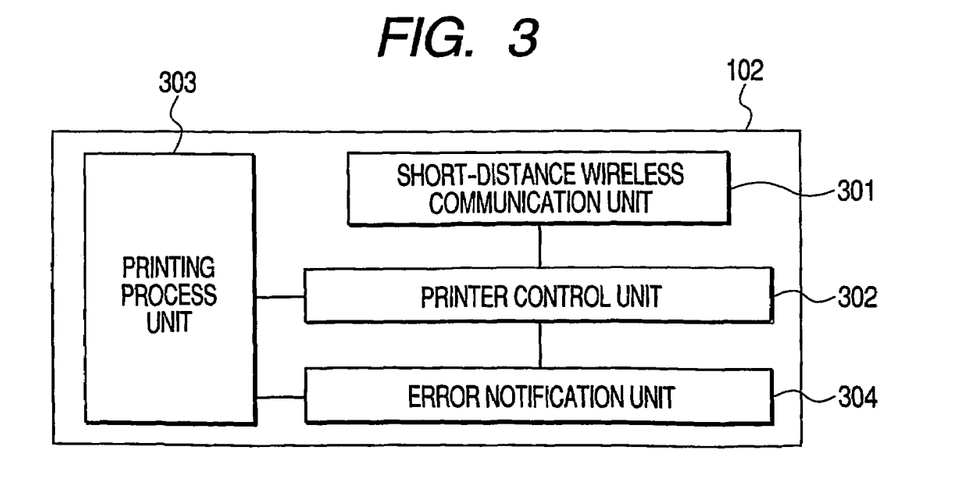
FIG. 3 is a diagram of a configuration of functional blocks of a printer according to the embodiment of the present invention.

The printer 102 has at least a short-distance wireless communication unit 301, a printer control unit 302, a printing process unit 303, and an error notification unit 304.

The short-distance wireless communication unit 301 has a function which uses a short-distance wireless communication scheme to perform wireless communication with a peripheral terminal.

The printing process unit 303 has a function which executes a printing request receiving process and a printing data acquiring process.

The error notification unit 304 has a function which notifies the image pickup device 101 of an error through the short-distance wireless communication unit 301 when an error occurs in printing in the printing process unit 303. Procedures of the re-printing process unit 207 activated by the image pickup device control unit 202 which is performing a data transfer process with reference to FIGS. 4 to 7.

Figure 5:
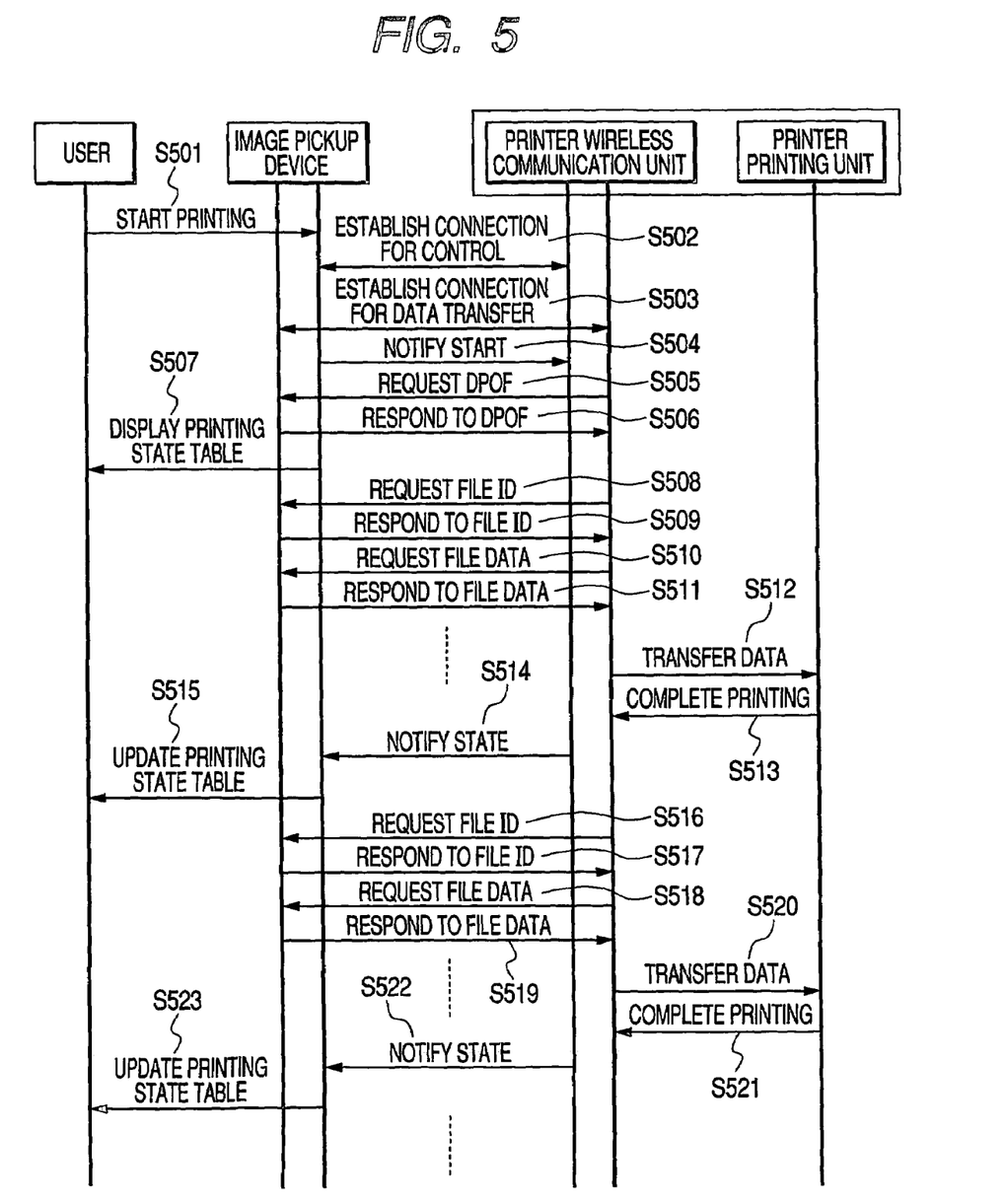
FIG. 5 is a sequence diagram of a printing process according to the embodiment of the present invention.

FIG. 5 shows a flow of the printing data transfer process as a sequence diagram.

In step S501, a user designates an image pickup device to start printing through the user interface unit 203. At this time, a printing file (image selected from photographed images stored in the data storage unit 205) and a printer which executes printing are assigned by the user through the user interface unit 203.

In step S502, connection for control in the printing process is established.

In step S503, connection for image data transfer in the printing process is established.

In step S504, the image pickup device 101 notifies the printer 102 of the start of the printing process.

In step S505, a message which requests a printing request is transferred from the printer 102 to the image pickup device 101.

Figure 4:
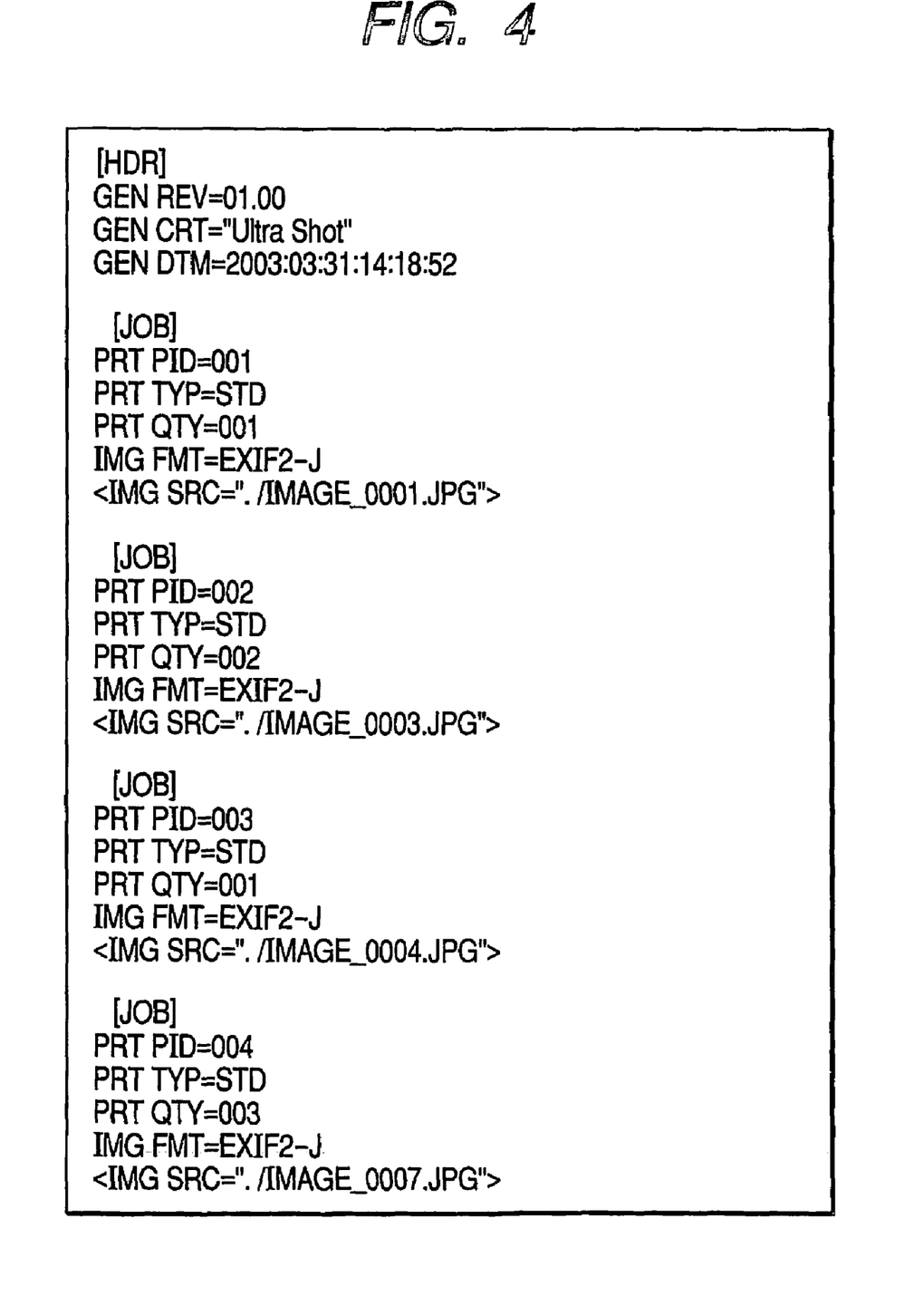
FIG. 4 is a diagram showing a printing request made in a DPOF format according to the embodiment of the present invention.

In step S506, on the basis of printing file information input in the step S501, a printing request of a DPOF format as shown in FIG. 4 is formed and then transmitted to the printer 102. In this embodiment, a printing request of the following seven image files which are described below as a printing file in FIG. 4 is formed to perform the printing process.

IMAGE_0001. JPEG: ONE IMAGE

IMAGE_0003. JPEG: TWO IMAGES

IMAGE_0004. JPEG: ONE IMAGE

IMAGE_0007. JPEG: THREE IMAGES

Figure 6:
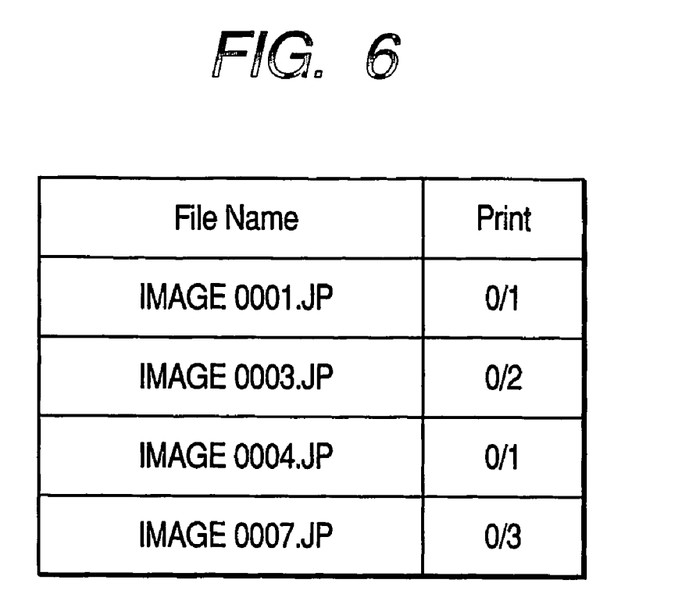
FIG. 6 is a printing state table according to the embodiment of the present invention.

In step S507, on the basis of the printing request formed in the step S506, a printing state table as shown in FIG. 6 is formed and output to be displayed through the user interface unit 203. As shown in FIG. 6, the printing state table displays a list of file names to be processed and a printing state related to each printing file in the form of, for example, "(the number of files which have been printed)/(the number of files to be printed)". The printing state table is stored in the data storage unit 205. Each time the printing state table is updated in the subsequent processes, the printing state table stored in the data storage unit 205 is also updated.

In step S508, on the basis of a printing request, the printer 102 requests the ID of the first printing file (IMAGE_0001.JPG) to be printed from the image pickup device 101.

In step S509, the image pickup device 101 transmits the ID of the first printing file to be printed to the printer 102.

In step S510, the printer 102 transmits a printing file data request including a file ID, an offset, an amount of data to be transferred, and the like to the image pickup device 101.

In step S511, the image pickup device 101 transmits assigned data to the printer 102 according to information of in the printing file data request received in the step 510. The transmitted data is stored in the buffer of the printer.

Subsequently, until all the data of the first printing file to be printed are transferred, the processes in step S510 and step S511 are repeated.

In step S509, when the data transfer of the printing file of the file ID which is notified to the printer 102, in step S512, the printing file data stored in the buffer is transferred to the printing process unit 303 to print the printing file.

In step S513, upon completion of the printing of the printing file, the printing process unit 303 notifies a printing completion message.

In step S514, the printer 102 transmits a state notification message for notifying that the printing of the first printing file is completed to the image pickup device 101.

Figure 7:
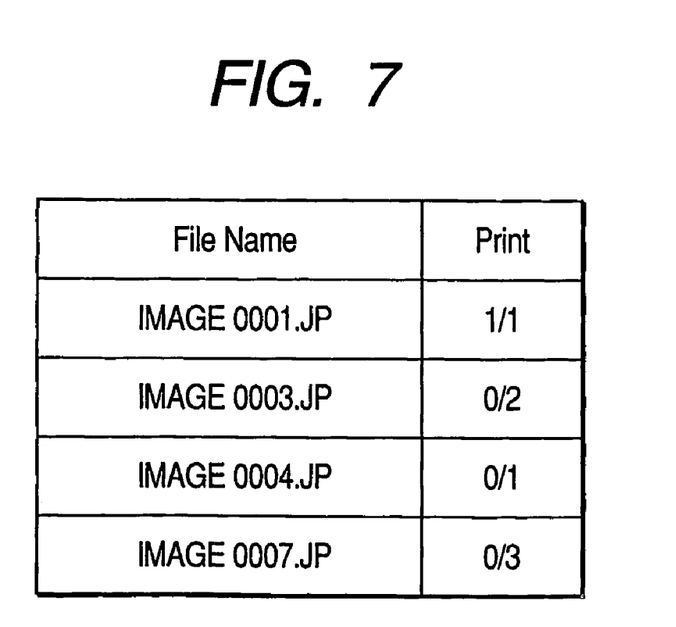
FIG. 7 is an updated printing state table according to the embodiment of the present invention.

In step S515, the image pickup device 101 updates the printing state table stored in the data storage unit 205 as shown in FIG. 7 by the received printing completion notification, and displays the printing state table through the user interface unit 203.

A series of processes in step S508 to step S515 until printing of all the files described in the printing request is completed.

With the above procedures, the display process of the printing state is performed.

In this embodiment, upon completion of the data transfer of one image file, the printer 102 transfers the image file to the printing process unit 303 to perform printing process. After notification of the completion of printing, the printer 102 makes a transfer request of the next image file. However, it is not necessary to synchronously perform the printing of the image file and the transfer of the image file data. The printer 102 may immediately transfer partial data to perform a printing process immediately after the printer 102 receives the partial data, or the printer 102 may request the next image file before receiving the notification of completion of printing. A procedure of the re-printing process unit 207 activated by the image pickup device control unit 202 in case of retrying the printing data transfer process will be described below with reference to FIGS. 8, 9, 10, 11, and 12.

Figure 8:
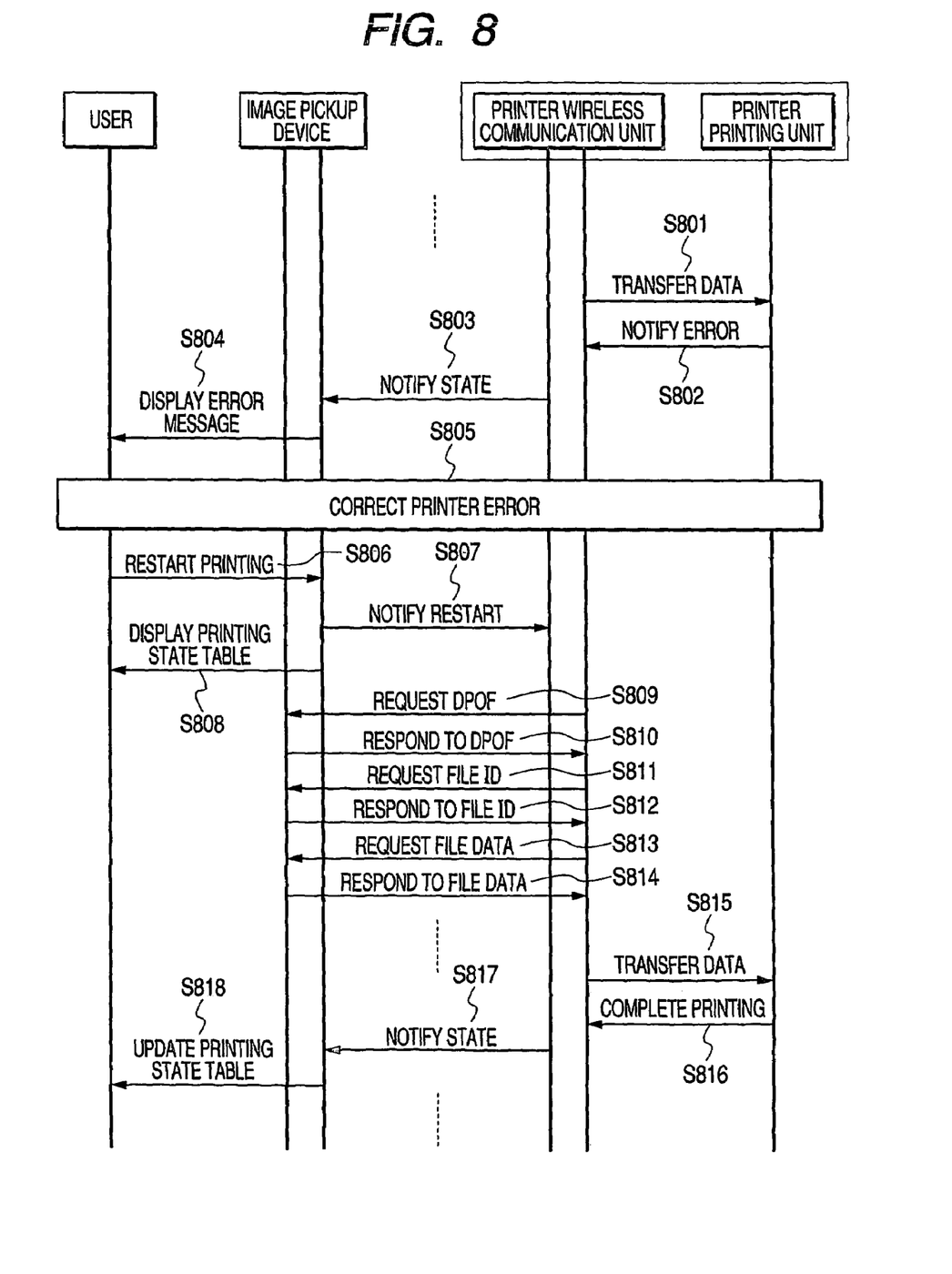
FIG. 8 is a sequence diagram of a printing process in occurrence of a printer error according to the embodiment of the present invention.

FIG. 8 shows a flow of processes performed until a re-printing process after occurrence of a printer error as a sequence diagram.

In this case, it is assumed that paper jam occurs in printing of the second sheet of paper of IMAGE_0003.JPG.

In step S801, the data an image file (IMAGE_0003.JPG) transmitted from the image pickup device 101 is transferred to the printing process unit 303 to perform a printing process.

In step S802, since a paper jam error occurs in the printing of the second sheet of paper of IMAGE_0003.JPG, the printing process unit 303 notifies the error notification unit 304 of the occurrence of the printer error and the type (paper jam) of the error.

In step S803, the error notification unit 304 notifies the image pickup device 101 of a state notification message including error information on the basis of the information notified by the printing process unit 303.

Figure 9:
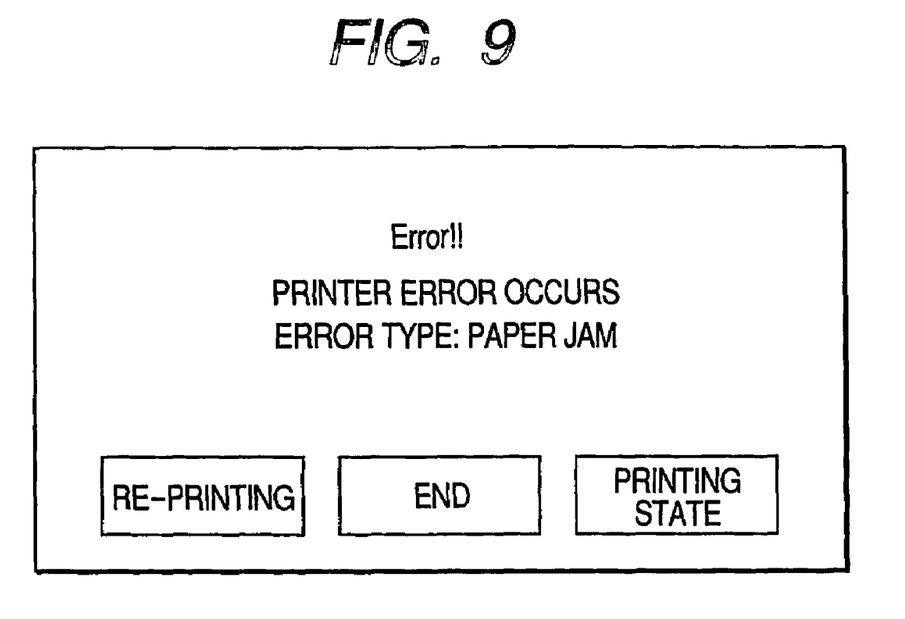
FIG. 9 is an example of an error message in an image pickup device when an error occurs in the printer according to the embodiment of the present invention.

In step S804, the image pickup device 101 outputs an error message shown in FIG. 9 through the user interface unit 203. The error message comprises, an "error type" representing the type of an error, a "re-printing" button for retrying the printing, an "end" button for ending the printing, and a "printing state" button which displays a printing state when an error is detected. When a user selects the "re-printing" button, the image pickup device control unit 202 activates a re-printing process executed in step S806 and subsequent steps. When the user selects the "end" button, the image pickup device control unit 202 ends the printing process. When the user selects the "printing state" button, the image pickup device control unit 202 reads a printing state table from the data storage unit 205 and displays the printing state table.

In step S805, the user repairs the paper jam of the printer. In step S806, the user selects the "re-printing" button in the error message displayed in the step S804.

Figure 10:
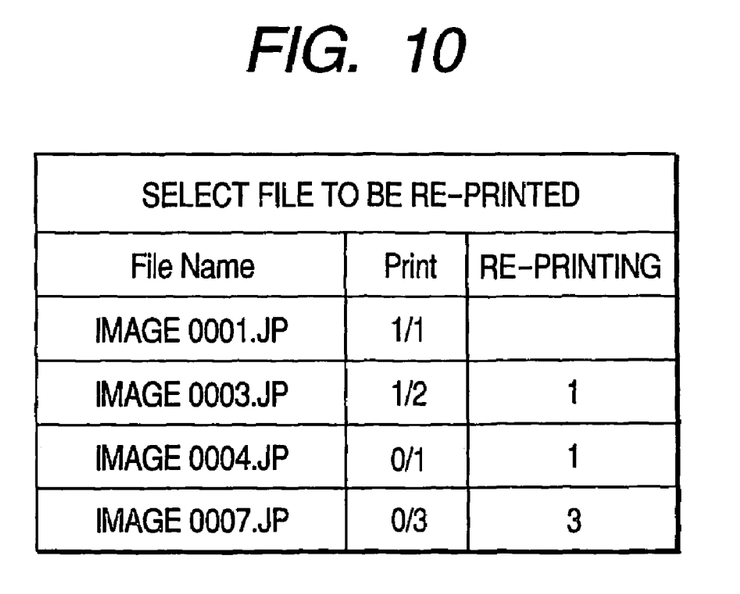
FIG. 10 is an example of a printing request data selection message obtained when a re-printing request is made after error recovery in the printer according to the embodiment of the present invention.

In step S808, the printing state table is read from the data storage unit 205, a re-printing file selection message based on printing state information in the table as shown in FIG. 10 is output through the user interface unit 203. In the re-printing file selection message, a printing state until the printing is interrupted is displayed in a column "Print", and the information of a file the printing of which is not completed is displayed in a column "re-printing" as the number of prints of each image file when the re-printing is performed. The user can change the number of prints displayed in the column "re-printing". In this manner, in case of shortage of paper or ink, the user can select and print a file to be preferentially printed.

Figure 11:
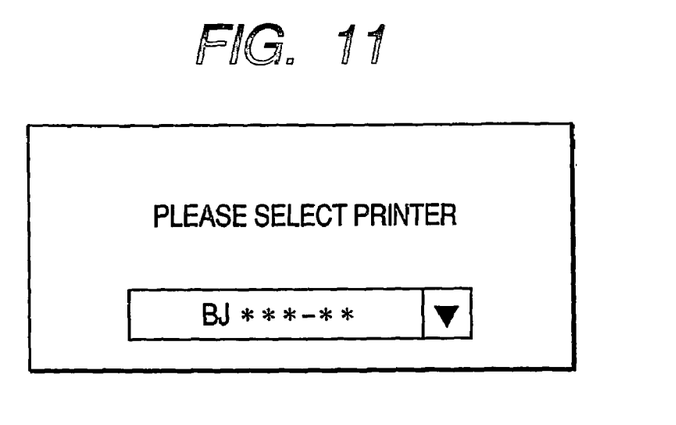
FIG. 11 is an example of a printer selection message obtained when a re-printing request is made after error recovery in the printer according to the embodiment of the present invention.

After the selection of a file to be re-printed, a printer selection message as shown in FIG. 11 is output through the user interface unit 203. The printer selection message makes it possible that the user can select a specific printer by which the re-printing is performed.

Figure 12:
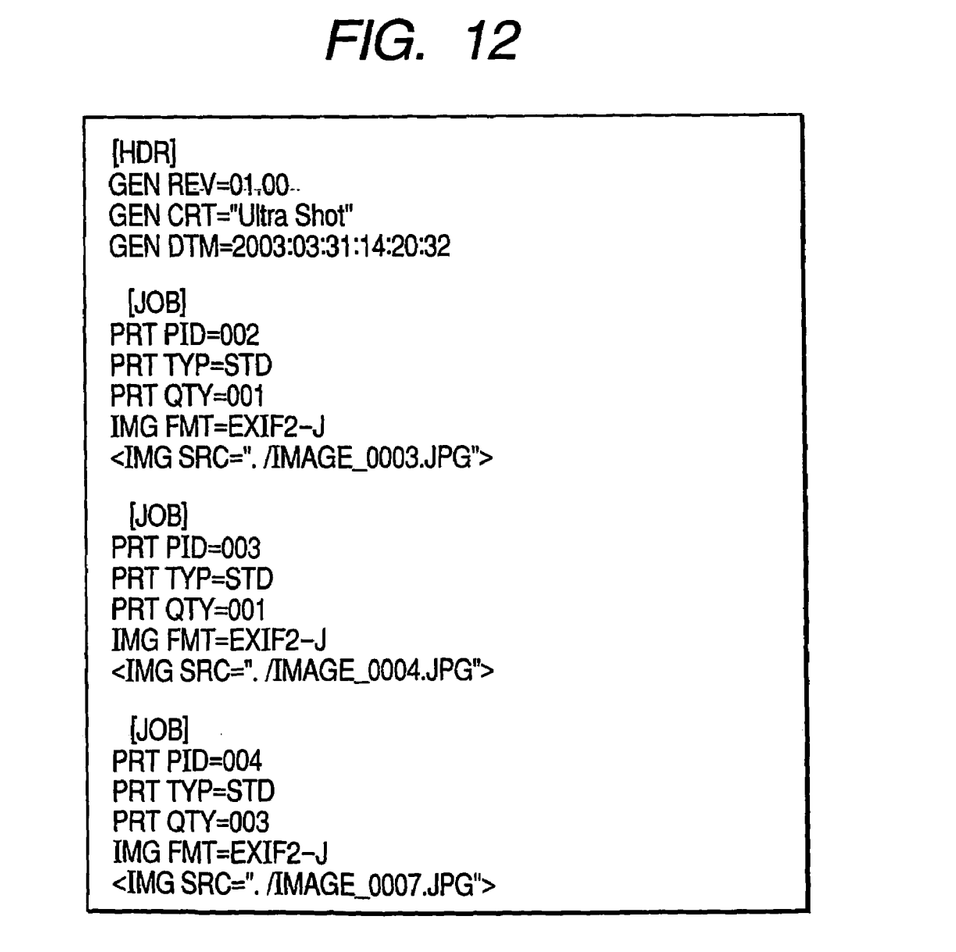
FIG. 12 is a diagram showing a re-printing request is transmitted to the printer according to the embodiment of the present invention.

In step S809, a re-printing process unit 209 forms a printing request related to re-printing as shown in FIG. 12 on the basis of the re-printing file information selected in the re-printing file selection message and transmits a printing request to the printer selected in the printer selection message, so that a re-printing process in step S810 and the subsequent steps is performed.

The printing process in step S810 and the subsequent steps is performed according to the same flow as that of the printing process described with reference to FIG. 5 until all the image files described in the printing request are printed.

With the above procedures, the re-printing process is performed after a printer error occurs.

Second Embodiment

In the first embodiment, when printing of a file is completed, or each time an error occurs, a notification for notifying an image pickup device of the state of a printer is transmitted from the printer. However, when the printer does not comprise such a notification function, the state of the printer must be acquired by requesting a notification message from the image pickup device.

Therefore, in the second embodiment, the image pickup device comprises a timer for requesting a state notification when no notification message is transmitted from the printer side. The image pickup device has means for transmitting a state notification request message using the timer to acquire the state information of the printer.

Each time the transmission of one file data is completed, the image pickup device activates the state notification request timer. When the timer counts a predetermined period of time, the image pickup device transmits the state notification request to the printer. When the printer receives the state notification request, the printer notifies the image pickup device of the state of the printer.

With the above procedures, the image pickup device can achieve an effect which is unique to the second embodiment and which acquires the state of the printer when no notification message is transmitted from the printer side.

Third Embodiment

In the first and second embodiments, on the basis of information notified from the printer side, processing states such as progress or an error are shown to a user.

However, in order to realize the above process by using BIP (Basic Imaging Profile) of Bluetooth as a communication scheme, the image pickup device cannot display the processing states based on the notification information because the BIP includes no message for notifying of the state of a printer.

Therefore, as the third embodiment, an embodiment in which processing states can be shown to a user even though a notification message is not received from a device side which performs processing will be described below.

In this embodiment, an image pickup device 101 comprises progress updating means and an error detection timer T.

The progress updating means monitors a request/response message of file data to monitor transfer states of files. When the transfer of the files is completed, the printing state table is updated.

When a predetermined period of time has elapsed after the start of the timer, time set in the error detection timer T expires. In this case, the image pickup device 101 determines that an error occurs in the printer 102.

Figure 13:
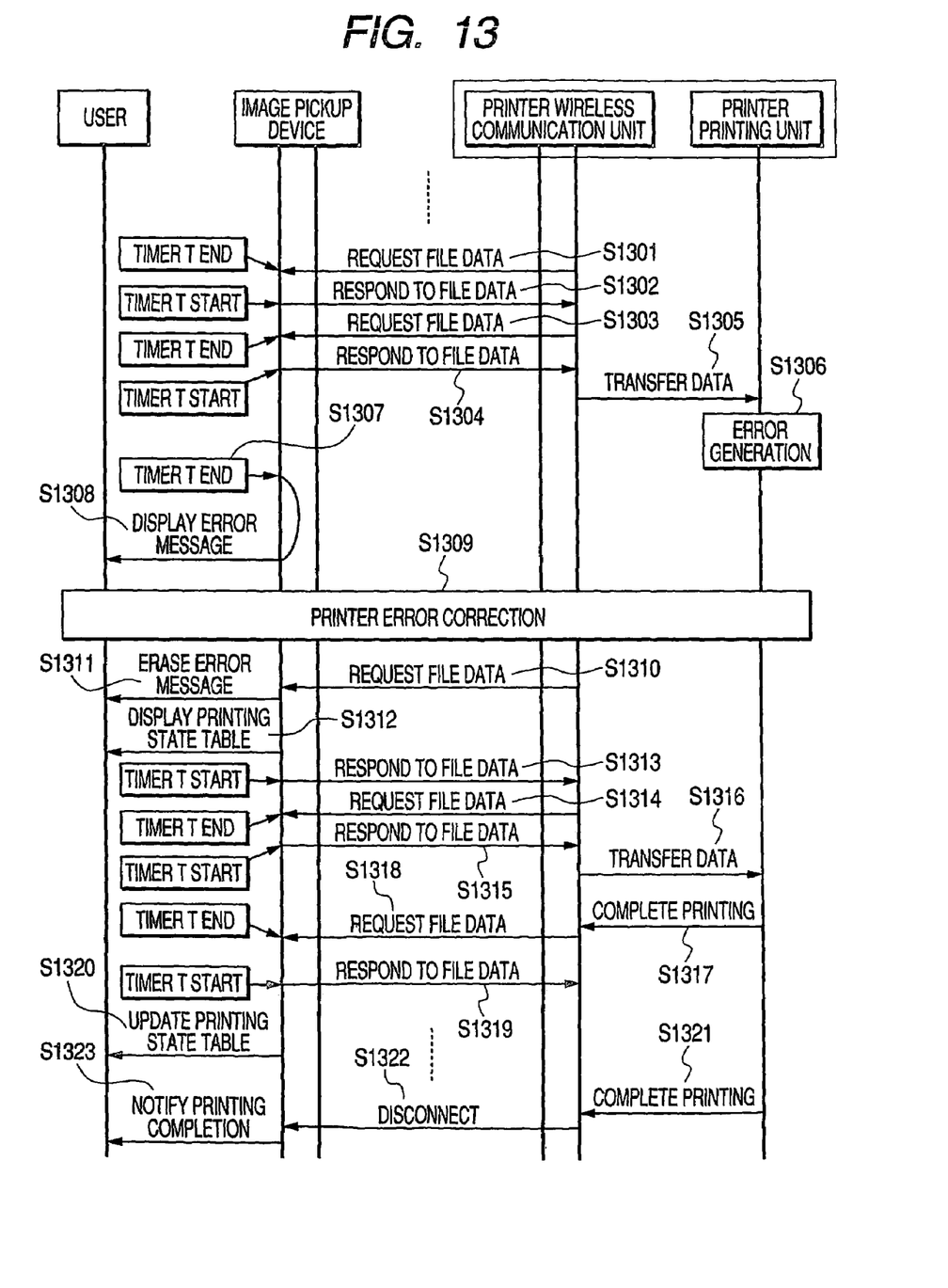
FIG. 13 is a sequence diagram of a printing process performed by BIP between an image pickup device and a printer according to the embodiment of the present invention.

FIG. 13 shows printing procedures performed when the BIP is used.

The first procedure of the printing process is the same as that shown in FIG. 5. A printer 102 receives a printing request of a DPOF format, requests file data to be printed to the image pickup device 101, and perform a printing process of the received data.

In step S1301, the printer 102 transfers a message which requests file data to the image pickup device 101. When the image pickup device 101 receives a file data request message, the image pickup device 101 stops the active error detection timer T.

In step S1302, the image pickup device 101 transfers the requested file data to the printer 102 and starts the error detection timer T.

In step S1303 and step S1304, data transfer is performed by the same procedures as in the steps S1301 and S1302.

In step S1305, the printer 102 transfers the received data to the printing process unit 303 to perform a printing process.

In step S1306, an error caused by paper jam occurs in the printing process of the printer 102. When the error occurs, the printer 102 stops a file data request to the image pickup unit 101.

When a predetermined period of time has elapsed after the file data request by the printer 102 is stopped, the error detection timer T expires in step S1307. When the error detection timer T expires, the image pickup device 101 detects that an error occurs in the printer.

Figure 14:
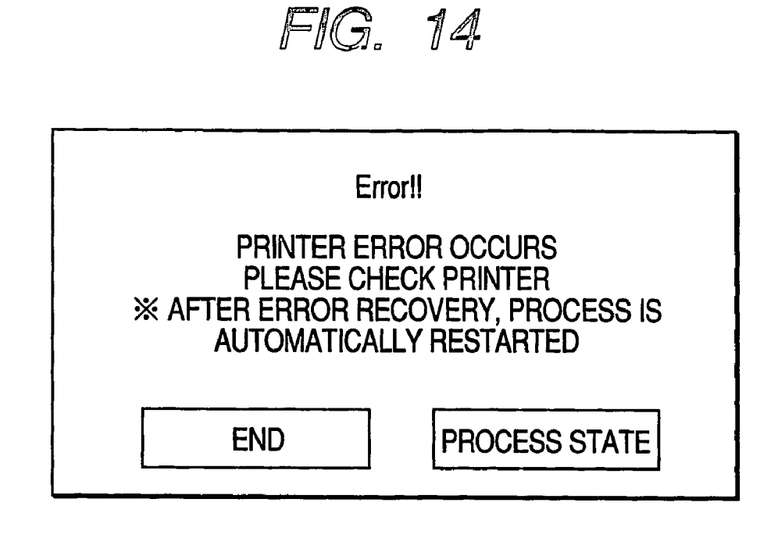
FIG. 14 is an example of an error message obtained in the image pickup device when an error occurs in the printer according to the embodiment of the present invention.

In step S1308, the image pickup device 101 displays a message as shown in FIG. 14 to notify the user that an error occurs in the printer. The error message includes two buttons, i.e., "end" and "processing state" buttons. When the "end" button is selected, the image pickup device 101 performs processes such as disconnection, timer stoppage, and table deletion and then ends the processes. When the "printing state" button is selected, the image pickup device reads a printing state table from the data storage unit 205 and display the printing state table for a user.

In step S1309, a user finds out the abnormality of the printer 102 with an error message to repair the paper jam error.

In step S1310, the printer 102 the state of which returns to a normal state when the error is repaired, the printer 102 starts requesting file data from the image pickup device 101 again.

In step S1311, when the image pickup device 101 receives the file data request message from the printer 102 after the error message is displayed, the image pickup device 101 determines that the printer 102 recovers from the error to erase the error message.

In step S1312, the image pickup device 101 reads the printing state table from the data storage unit 205 and displays the printing state table for a user.

Subsequently, in step S1313 to step S1319, the image pickup device 101 and the printer 102 perform the data transfer process and the printing process by the same procedures as described above.

In step S1320, since the transfer of the file which is the response in step S1319 is completed, the printing state table is updated by the progress updating means. The updated printing state table is displayed for a user in the same manner as that in FIGS. 6 and 7.

Subsequently, the same transfer process is repeated, and, in step S1321, the printing process unit S303 notifies the printer control unit 302 that all the printing processes are completed.

In step S1322, the printer control unit 302 to which the completion of printing is notified designates the short-distance wireless communication unit 301 to cut a communication connection to cut the connection.

Figure 15:
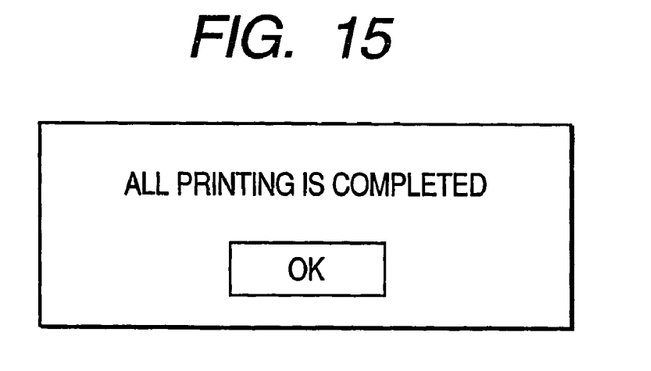
FIG. 15 is an example of an error message in the image pickup device upon completion of printing in the printer according to the embodiment of the present invention.

In step S1323, when the image pickup device 101 detects that the communication connection is cut, the image pickup device 101 checks a progress state stored in the printing information table. When transfer of all data is completed, the image pickup device 101 determines that the printing is completed, displays a completion message as shown in FIG. 15 for a user, and ends the process.

Figure 16:
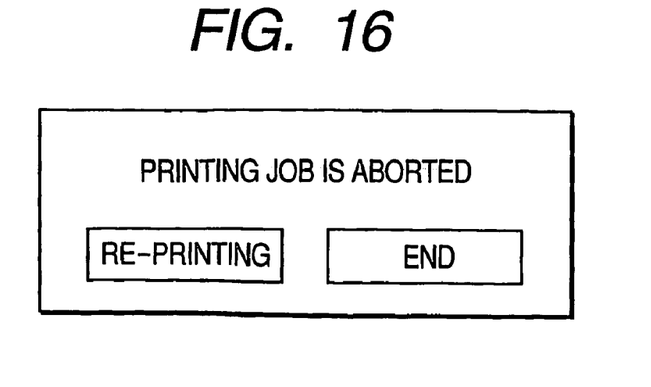
FIG. 16 is an example of a message in the image pickup device in interruption of printing after error occurrence in the printer according to the embodiment of the present invention.

An error which cannot be repaired may occur to cut the communication connection. In such a case, the image pickup device 101 which detects that the connection is cut checks a progress state stored in the printing information table to recognize that the transfer of all the data is not completed. For this reason, the image pickup device 101 determines that the process is erroneously ended in on its way, and an error message as shown in FIG. 16 is displayed for a user. The error message includes two buttons, i.e., "re-printing" and "end" buttons. When the "re-printing" button is selected, the image pickup device 101 performs the same re-printing process as the process described in step S806 to step S810 in the first embodiment. When the "end" button is selected, the image pickup device 101 ends the process after the end processes such as the process of ending the error detection timer and the process of erasing the table.

With the above procedures, the image pickup device 101 notifies a user of the processing state without receiving a notification from the printer 102.

By using the present invention as described above, for example, a user can confirm a specific file the printing of which is completed during transfer.

Furthermore, the user can easily recognize a specific file the printing of which is not completed in re-printing. A file to be re-printed and a printer which performs the re-printing process are easily selected, so that the re-printing process can be smoothly performed.

The printing process between the image pickup device and the printer has been described above. However, when an image from the image pickup device is stored in a storage such as a hard disk, the same control as that performed when an image stored in the storage is printed by the printer can be performed.

With the above effect, a user interface which is more convenient for a user and which has good usability can be provided.

When retrial is performed after an error occurs, information which is notified to another device is re-formed. For this reason, a drawback caused by a variation in recognition of error states between devices can be prevented.

When information which is notified to another device is re-formed, information for retrial can be edited by a user. For this reason, the retrial depending on, for example, residual quantity of ink, paper, or the like of in the printer can be performed.

Even though another device does not have a function such as an error notification function, an error of the another device can be detected.

The invention claimed is:

1. An electronic apparatus comprising:
    a forming device configured to form a list which includes information for designating a plurality of data and is used for extracting data for executing a predetermined process by a second electronic apparatus;
    a notification device configured to notify the second electronic apparatus of the list formed by said forming device;
    a transmission device configured to transmit the data for causing the second electronic apparatus to execute the predetermined process in response to a request based on the list from the second electronic apparatus;
    a decision device configured to decide a progress of the predetermined process by the second electronic apparatus;
    an identification device configured to identify errors that occurred in executing the predetermined process by the second electronic apparatus;
    a re-forming device configured to re-form a list in accordance with the identification of the error occurrence by said identification device, based on the progress decided by said decision device; and
    a re-transmission device configured to transmit the re-formed list to the second electronic apparatus.

2. The electronic apparatus according to claim 1, wherein the list includes information relating to a unique name of the data for causing the second electronic apparatus to execute the predetermined process.

3. The electronic apparatus according to claim 2, wherein the list includes the number of data to be processed among the data for causing the second electronic apparatus to execute the predetermined process.

4. The electronic apparatus according to claim 1, further comprising a display device configured to display the progress of the predetermined process of the data designated by the list based on the decision by said decision device.

5. The electronic apparatus according to claim 4, wherein said display device displays the number of the data to be processed and the number of completed processes, corresponding to the information for designating data.

6. The electronic apparatus according to claim 1, wherein said identification device identifies a type of the occurred error.

7. The electronic apparatus according to claim 1, further comprising:
    a display device configured to display, in a selectable form, whether or not retrying the predetermined process, in case where said identification device identifies that the second electronic apparatus is in an error state,
    wherein said re-forming device re-forms the list in case where the retry is selected.

8. The electronic apparatus according to claim 7, wherein said display device displays, in a selectable form, the electronic apparatuses for executing the predetermined process of the data designated by the re-formed list.

9. The electronic apparatus according to claim 1, further comprising:
    a second display device configured to display information signifying unprocessed data of the predetermined process by the second electronic apparatus and the number of times of the unprocessed each data in accordance with the identification of error occurrence by said identification device, and displaying at least the number of unprocessed times so that a user may change; and
    a change device configured to change the information displayed by said second display device based on a user's manipulation,
    wherein said re-forming device re-forms the list in accordance with the change by said change device.

10. The electronic apparatus according to claim 1, wherein said identification device initiates a timer at the time of sending a response to a request of extracting the data from the second electronic apparatus, and identifies the error occurrence in the second electronic apparatus in case where a next extracting request is not received within a predetermined period.

11. An electronic apparatus comprising:
    a forming device configured to form a list which includes information for designating a plurality of data and is used for extracting data for executing a predetermined process by a communication partner;
    a notification device configured to notify the communication partner of the list formed by said forming device;
    a reception device configured to receive a transmission request for data based on Basic Imaging Profile of Bluetooth standard which is transmitted from the communication partner based on the list;
    a transmission device configured to transmit the data to the communication partner in accordance with the transmission request received by said reception device;
    a timer device configured to time predetermined time in response to the data transmission by said transmission device; and
    a decision device configured to decide that an error has occurred in the communication partner, in case where there exists data which is designated by the list and is not still transmitted to the communication partner, and next transmission request is not received by said reception device after the predetermined time elapsed.

12. A data processing method of an electronic apparatus comprising:
    a first forming step of forming a list which includes information for designating a plurality of data and is used for extracting data for executing a predetermined process by a second electronic apparatus;
    a notification step of notifying the second electronic apparatus of the list formed in said forming step;
    a transmission step of transmitting the data for causing the second electronic apparatus to execute the predetermined process in response to a request based on the list from the second electronic apparatus;
    a decision step of deciding a progress of the predetermined process by the second electronic apparatus;
    an identification step of identifying an error occurred in executing the predetermined process by the second electronic apparatus;
    a re-forming step of re-forming the list in accordance with the identification of the error occurrence in said identification step, based on the progress decided in said decision step; and
    a re-transmission step of re-transmitting the re-formed list to the second electronic apparatus.

13. A data processing method of an electronic apparatus comprising:
    a forming step of forming a list which includes information and is used for extracting data for executing a predetermined process by a communication partner;
    a notification step of notifying the communication partner of the list formed in said forming step;

a reception step of receiving a transmission request of data based on Basic Imaging Profile of Bluetooth standard which is transmitted from the communication partner based on the list;

a transmission step of transmitting the data to the communication partner in accordance with the transmission request received in said reception step;

a timer step of timing predetermined time in response to the data transmission in said transmission step; and a decision step of deciding that an error has occurred in the communication partner, in case where there exists data which is designated by the list and is not still transmitted to the communication partner, and next transmission request is not received in said reception step after the predetermined time elapsed.

* * * * *

UNITED STATES PATENT AND TRADEMARK OFFICE
CERTIFICATE OF CORRECTION

| | |
|---|---|
| PATENT NO. | : 7,389,448 B2 |
| APPLICATION NO. | : 10/548885 |
| DATED | : June 17, 2008 |
| INVENTOR(S) | : Tatsuhiko Sakai |

It is certified that error appears in the above-identified patent and that said Letters Patent is hereby corrected as shown below:

[57] REFERENCES CITED

Foreign Patent Documents
    "JP 14-320174 A   10/2002" should read --JP 2002-320174 A   10/2002--.
    "JP 6-242901   9/1994" (first occurrence) should be deleted.

COLUMN 1

Line 57, "provide" should read --reduce--.
    Line 61, "provide to" should be deleted.

COLUMN 3

Line 7, "(extensible" should read --(eXtensible--.
    Line 61, "unit 207" should read --unit 207 are--.

COLUMN 5

Line 1, "step S515" should read --step S515 are repeated--.
    Line 27, "data" should read --data of--.
    Line 42, "comprises," should read --comprises--.

COLUMN 7

Line 14, "perform" should read --performs--.
    Line 47, "display" should read --displays--.

COLUMN 8

Line 66, "like of" should read --like,--.

COLUMN 9

Line 66, "each" should be deleted.

UNITED STATES PATENT AND TRADEMARK OFFICE
CERTIFICATE OF CORRECTION

PATENT NO.       : 7,389,448 B2
APPLICATION NO.  : 10/548885
DATED            : June 17, 2008
INVENTOR(S)      : Tatsuhiko Sakai It is certified that error appears in the above-identified patent and that said Letters Patent is hereby corrected as shown below:

<u>COLUMN 10</u>

Line 4, "said the" should read --said--.

Signed and Sealed this

Second Day of December, 2008

JON W. DUDAS
*Director of the United States Patent and Trademark Office*